(12) United States Patent
Watanabe et al.

(10) Patent No.: US 11,927,208 B2
(45) Date of Patent: Mar. 12, 2024

(54) ROTATIONAL COUPLER AND METHOD FOR MANUFACTURING THE SAME

(71) Applicant: TOYOTA BOSHOKU KABUSHIKI KAISHA, Aichi (JP)

(72) Inventors: Takuma Watanabe, Aichi (JP); Yusuke Inomata, Aichi (JP)

(73) Assignee: TOYOTA BOSHOKU KABUSHIKI KAISHA, Aichi (JP)

(*) Notice: Subject to any disclaimer, the term of this patent is extended or adjusted under 35 U.S.C. 154(b) by 720 days.

(21) Appl. No.: 17/056,280

(22) PCT Filed: Apr. 16, 2019

(86) PCT No.: PCT/JP2019/016349
§ 371 (c)(1),
(2) Date: Nov. 17, 2020

(87) PCT Pub. No.: WO2019/225227
PCT Pub. Date: Nov. 28, 2019

(65) Prior Publication Data
US 2021/0254647 A1  Aug. 19, 2021

(30) Foreign Application Priority Data
May 23, 2018 (JP) .................. 2018-099025

(51) Int. Cl.
*F16B 12/12* (2006.01)
*F16C 11/10* (2006.01)

(52) U.S. Cl.
CPC .............. *F16B 12/12* (2013.01); *F16C 11/10* (2013.01); *Y10T 403/32336* (2015.01); *Y10T 403/32368* (2015.01)

(58) Field of Classification Search
CPC .... B60N 2/2362; B60N 2/235; B60N 2/2356; B60N 2/224; B60N 2/2227; B60N 2/2252;
(Continued)

(56) References Cited

U.S. PATENT DOCUMENTS 6,554,361 B2 * 4/2003 Reubeuze ............... B60N 2/236
297/367 R
6,666,515 B2 * 12/2003 Asano .................. B60N 2/2362
297/367 R
(Continued)

FOREIGN PATENT DOCUMENTS

DE   102019110151 A1 * 10/2019 ............... B60N 2/20
JP   2011-116352      6/2011
(Continued)

OTHER PUBLICATIONS

Japan Office Action issued in Japan Patent Application No. 2018-99025, dated Sep. 7, 2021, along with an English translation thereof.
(Continued)

*Primary Examiner* — Jonathan P Masinick
(74) *Attorney, Agent, or Firm* — GREENBLUM & BERNSTEIN, P.L.C.

(57) ABSTRACT

A rotational coupler in one aspect of the present disclosure includes a plate-shaped first member, a plate-shaped second member, a tapered portion, and an outer circumferential ring. The outer circumferential ring includes a first ring flange configured to externally come into contact with the first member. The outer circumferential ring includes a bent portion in a middle part of the second ring flange in an extending direction. The bent portion is bent to protrude toward the first plate of the first member.

4 Claims, 7 Drawing Sheets

(58) Field of Classification Search
CPC ......... A47C 1/025; A47C 1/026; F16C 11/10;
Y10T 403/32336; Y10T 403/32368
See application file for complete search history.

(56) References Cited

U.S. PATENT DOCUMENTS

| | | | | |
|---|---|---|---|---|
| 6,824,216 B2* | 11/2004 | Uramichi | ............... | B60N 2/235 |
| | | | | 297/366 |
| 6,854,802 B2* | 2/2005 | Matsuura | ............... | B60N 2/236 |
| | | | | 297/367 R |
| 9,056,566 B2* | 6/2015 | Nagura | ............... | B60N 2/2356 |
| 10,112,507 B2* | 10/2018 | Maeda | ..................... | B60N 2/20 |
| 10,279,709 B2* | 5/2019 | Suzuki | ............... | B60N 2/2356 |
| 10,442,323 B2* | 10/2019 | Maeda | ..................... | B60N 2/20 |
| 2008/0203799 A1* | 8/2008 | Yamada | ............... | B60N 2/2362 |
| | | | | 297/367 R |
| 2010/0109408 A1* | 5/2010 | Ohba | ..................... | B60N 2/236 |
| | | | | 297/367 P |
| 2011/0101754 A1 | 5/2011 | Suzuki et al. | | |
| 2012/0057926 A1* | 3/2012 | Fassebender | ......... | B60N 2/682 |
| | | | | 219/121.64 |
| 2012/0169104 A1* | 7/2012 | Stilleke | ............... | B60N 2/2252 |
| | | | | 297/367 P |
| 2012/0306254 A1* | 12/2012 | Ishihara | ............... | B60N 2/682 |
| | | | | 297/354.1 |
| 2015/0035338 A1 | 2/2015 | Endou | | |
| 2016/0009201 A1 | 1/2016 | Kim et al. | | |

FOREIGN PATENT DOCUMENTS

| | | | |
|---|---|---|---|
| JP | 2015-30342 | | 2/2015 |
| KR | 20120077522 A | * | 7/2012 |
| KR | 101173470 B1 | * | 8/2012 |

OTHER PUBLICATIONS

Official Communication issued in International Patent Application No. PCT/JP2019/016349, dated Jul. 2, 2019, along with English translation thereof.

International Preliminary Report on Patentability (IPRP) issued in International Patent Application No. PCT/JP2019/016349, dated Dec. 3, 2020, along with an English translation thereof.

* cited by examiner

ROTATIONAL COUPLER AND METHOD FOR MANUFACTURING THE SAME

CROSS-REFERENCE TO RELATED APPLICATION

This international application claims the benefit of Japanese Patent Application No. 2018-099025 filed on May 23, 2018 with the Japan Patent Office, the entire disclosure of Japanese Patent Application No. 2018-099025 is incorporated in this international application by reference.

TECHNICAL FIELD

The present disclosure relates to a rotational coupler such as a recliner.

BACKGROUND ART

A recliner at least comprises, as described in Patent Document 1 mentioned below for example, a plate-shaped guide member fixed to a cushion frame, and a plate-shaped ratchet fixed to a back frame. The recliner rotatably couples the back frame to the cushion frame.

The ratchet has a protruding flange formed on the outer circumference of the ratchet, and the flange has serrations that mesh with serrations formed on pawls. The pawls are movable toward and away from the flange. The pawls are housed in a space between the guide member and the ratchet.

The guide member guides the movement of the pawls in the radial direction of the guide member and restricts the movement of the pawls in the circumferential direction. The guide member and the ratchet are coupled by art outer circumferential ring.

The outer circumferential ring, while allowing the guide member to rotate relative to the ratchet, restricts the guide member from moving away from the ratchet. The outer circumferential ring comprises an annular ring body, a first ring flange, and a second ring flange and has a substantially U-shaped cross-section.

Specifically, the first ring flange and the second ring flange extend radially inward from the annular ring body. The first ring flange is in contact with the guide member from the outside.

The second ring flange is in contact with the ratchet from the outside. The outside means, when the space interposed between the guide member and the ratchet is defined as inside, the opposite side of the inside. In other words, the outside is on the outer-surface side of the rotational coupler (recliner)

One of the first ring flange and the second ring flange (the first ring flange, for example) is usually formed by plastic forming, such as swaging, after the guide member is attached to the ratchet.

Specifically, the outer circumferential ring prior to the swaging, that is, prior to formation of the first ring flange, comprises a ring body and a second ring flange and has a substantially L-shaped cross-section.

While the second ring flange is in contact with the outer surface of the ratchet, swaging is performed on the ring body such that the guide-member side of the ring body is squeezed; the first ring flange is, thus, integrally formed with the ring body.

PRIOR ART DOCUMENT

Patent Document

Patent Document 1: Japanese Unexamined Patent Application Publication No. 2015-30342

SUMMARY OF THE INVENTION

Problems to be Solved by the Invention

The ratchet needs to be rotatable with respect to the guide member. However, if at least one of the pressure on the contacting surfaces of the first ring flange and the guide member and the pressure on the contacting surfaces of the second ring flange and the ratchet is excessively high, a first problem is likely to he caused in which the ratchet cannot be easily rotated with respect to the guide member.

If at least one of the following states occurs, that is, either a state in which the first ring flange and the guide member are not in contact with each other and there is a large clearance between the first ring flange and the guide member, or a state in which the second ring flange and the ratchet are not in contact with each other and there is a large clearance between the second ring flange and the ratchet, a second problem may be caused in which the ratchet hits the guide member and an abnormal sound is generated when the ratchet is rotated with respect to the guide member.

It is desirable that one aspect of the present disclosure can provide a rotational coupler that can solve the first problem and/or the second problem described above.

Means for Solving the Problems

A rotational coupler in one aspect of the present disclosure comprising:
a plate-shaped first member comprising:
a disk-shaped first plate; and
a first flange extending from an outer rim of the first plate in a direction orthogonal to the first plate;
a plate-shaped second member comprising:
a disk-shaped second plate facing the first plate across a space; and
a second flange extending from an entirety of an outer rim of the second plate toward the first plate;
a tapered portion provided in a boundary area, positioned between the second flange and the second plate, on one side of the boundary area opposite to the space, the tapered portion being inclined toward the first plate along a radially outward direction; and
an outer circumferential ring configured to restrict the second plate from moving away from the first plate, the outer circumferential ring comprising:
an annular ring body;
a first ring flange extending radially inward from the ring body; and
a second ring flange extending radially inward from the ring body.
The first ring flange is configured to externally come into contact with the first member. The second ring flange comprises a bent portion that is bent to protrude toward the first plate, the bent portion being provided in a middle part the second ring flange in an extending direction.

In the above-described rotational coupler, the first member and the second member are interposed between the first ring flange and the bent portion of the second ring flange.

A person who manufactures the rotational coupler (hereinafter, a manufacturer) performs plastic forming (press working) by, for example, pressing the second ring flange in which the bent portion is not yet formed against the tapered portion with a metallic press die. Accordingly, the manufacturer can plastically deform a part of the second ring flange to form the bent portion.

Thus, a portion on the ring-body side in relation to the top of the bent portion goes back in a direction to be slightly away from the tapered portion due to a springback effect that occurs when the bent portion is formed. A portion of the bent portion on the leading-end side in relation to the top of the bent portion goes back in a direction to be adjacent to the tapered portion due to the springback effect that occurs when the bent portion is formed.

This inhibits the pressure on contacting surfaces of the first member and the second member from being excessively high and inhibits formation of a large clearance between the first member and the second member. As a result, the aforementioned first problem and/or second problem can be solved.

A rotational coupler in another aspect of the present disclosure is for pivotable coupling of a seatback to a seat cushion, the rotational coupler comprising:
a plate-shaped first member comprising:
a disk-shaped first plate; and
a first flange extending from an outer rim of the first plate in a direction orthogonal to the first plate, the first member being configured to be fixed to the seat cushion;
a plate-shaped second member comprising:
a disk-shaped second plate facing the first plate across a space; and
a second flange extending from an entirety of an outer rim of the second plate toward the first plate, the second member being configured to be fixed to the seatback;
a tapered portion provided in a boundary area, positioned between the second flange and the second plate, on one side of the boundary area opposite to the space, the tapered portion being inclined toward the first plate along a radially outward direction; and
an outer circumferential ring configured to restrict the second plate from moving away from the first plate, the outer circumferential ring comprising:
an annular ring body;
a first ring flange extending radially inward from the ring body; and
a second ring flange extending radially inward from the ring body.

The first ring flange is configured to come into contact with the first member from an opposite side of the space. The second ring flange comprises a bent portion that is bent to protrude toward the first plate. The bent portion is provided in a middle part of the second ring flange in an extending direction.

In the above-described rotational coupler, the pressure on the contacting surfaces of the first member and the second member is inhibited from being excessively high and a large clearance is inhibited from being formed between the first member and the second member. As a result, the aforementioned first problem and/or second problem can be solved.

The bent portion may comprise a top positioned radially outside of an outer edge of the tapered portion. This configuration can reliably solve the aforementioned first problem and/or second problem.

Still another aspect of the present disclosure provides a method for manufacturing the above-described rotational coupler, the method comprising:
attaching a before-swaging ring to the first member and the second member that are in contact with each other,
forming the first ring flange by plastic forming of the before-swaging ring attached; and
forming the bent portion by pressing a tip of the second ring flange in which the bent portion has been unformed against the tapered portion with a metallic press die so as to plastically deform the second ring flange.

The before-swaging ring corresponds to the outer circumferential ring in which the first ring flange and the bent portion have been unformed.

The above-described manufacturing method enables the manufacturer to manufacture the aforementioned rotational coupler.

EXPLANATION OF REFERENCE NUMERALS

Figure 1:
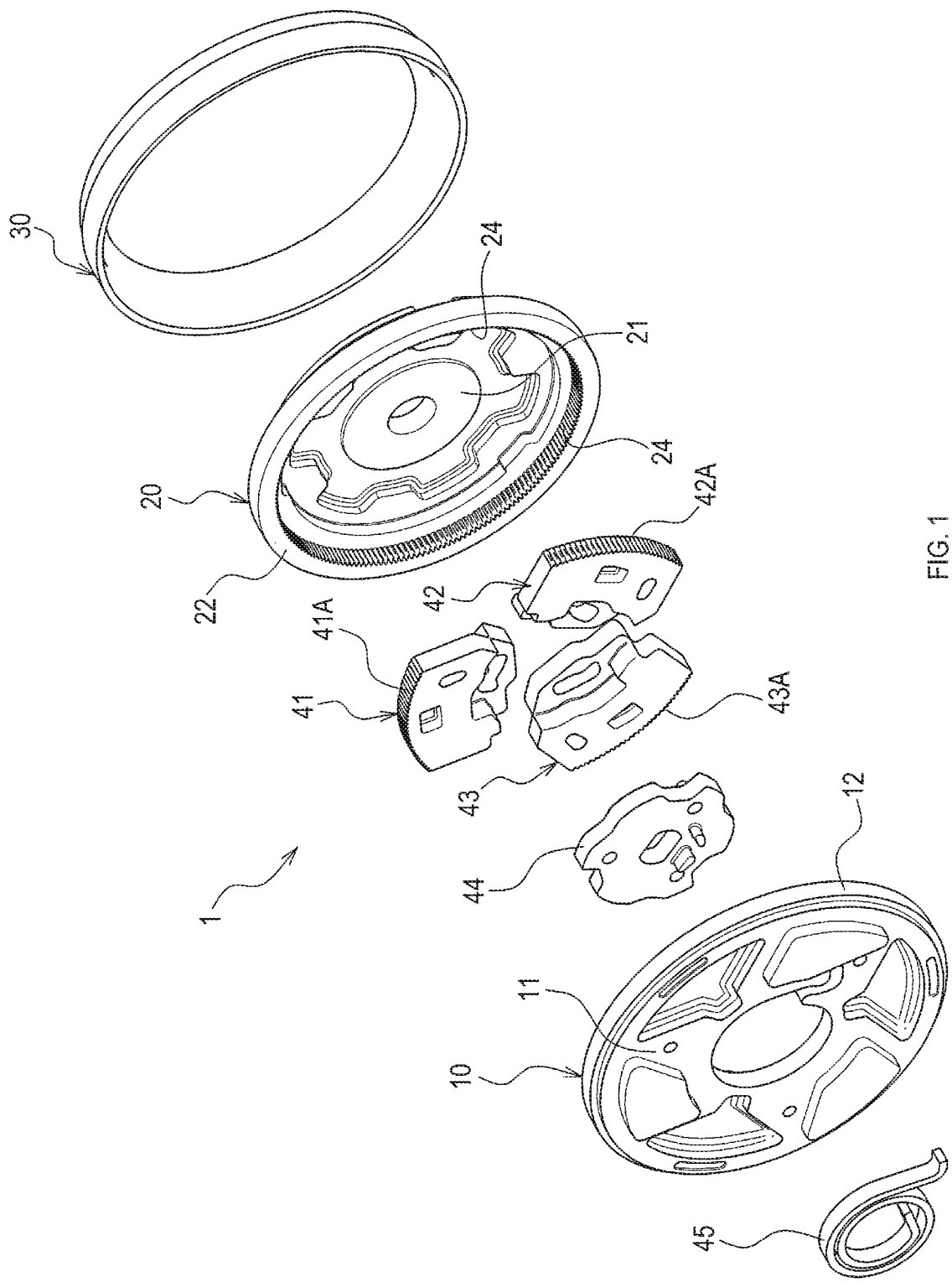
FIG. 1 is an exploded view of a recliner according to a first embodiment.

1 . . . recliner, 10 . . . guide member, 11 . . . first plate,
12 . . . first flange, 20 . . . ratchet, 21 . . . second plate,
22 . . . second flange, 23 . . . tapered portion, 25 . . . bent portion,
30 . . . outer circumferential ring, 31 . . . ring body,
32 . . . first ring flange,
33 . . . second ring flange

MODE FOR CARRYING OUT THE INVENTION

"Embodiments" described below are example embodiments that fall within the technical scope of the present disclosure. In other words, matters recited in the claims and the like are not limited to specific configurations, structures, and so on shown in the embodiments below.

In regard at least to a member or portion described with a reference numeral, at least one such a member or portion is provided unless there is a specifying term, such as "only one". In other words, two or more such members may be provided unless the number is specified by a term, such as "only one".

The present embodiments are examples of a rotational coupler (hereinafter also referred to as a recliner) according to the present disclosure used for a seat (hereinafter referred to as a vehicle seat) mounted on a vehicle, such as a car. Arrows and other marks indicating directions in the figures are provided for easy understanding of mutual relationships between the figures.

Accordingly, the invention described in the present disclosure should not be limited by the directions in the figures.

The directions shown in the figures are based on a state in which the vehicle seat according to the present embodiments is mounted to a car.

(First Embodiment)

1. Overview of Recliner

As shown in FIG. 1, a recliner 1 at least comprises, for example, a guide member 10, a ratchet 20, an outer circumferential ring 30, and pawls 41 to 43. In other words, the general configuration of the recliner 1 is the same as that of the invention described in the above-mentioned Patent Document 1.

<Guide Member>

The guide member 10 is one example of the first member in the present disclosure, and fixed to a cushion frame (not shown). The cushion frame forms the framework of a seat cushion. The seat cushion supports the buttocks of an occupant.

Figure 2:
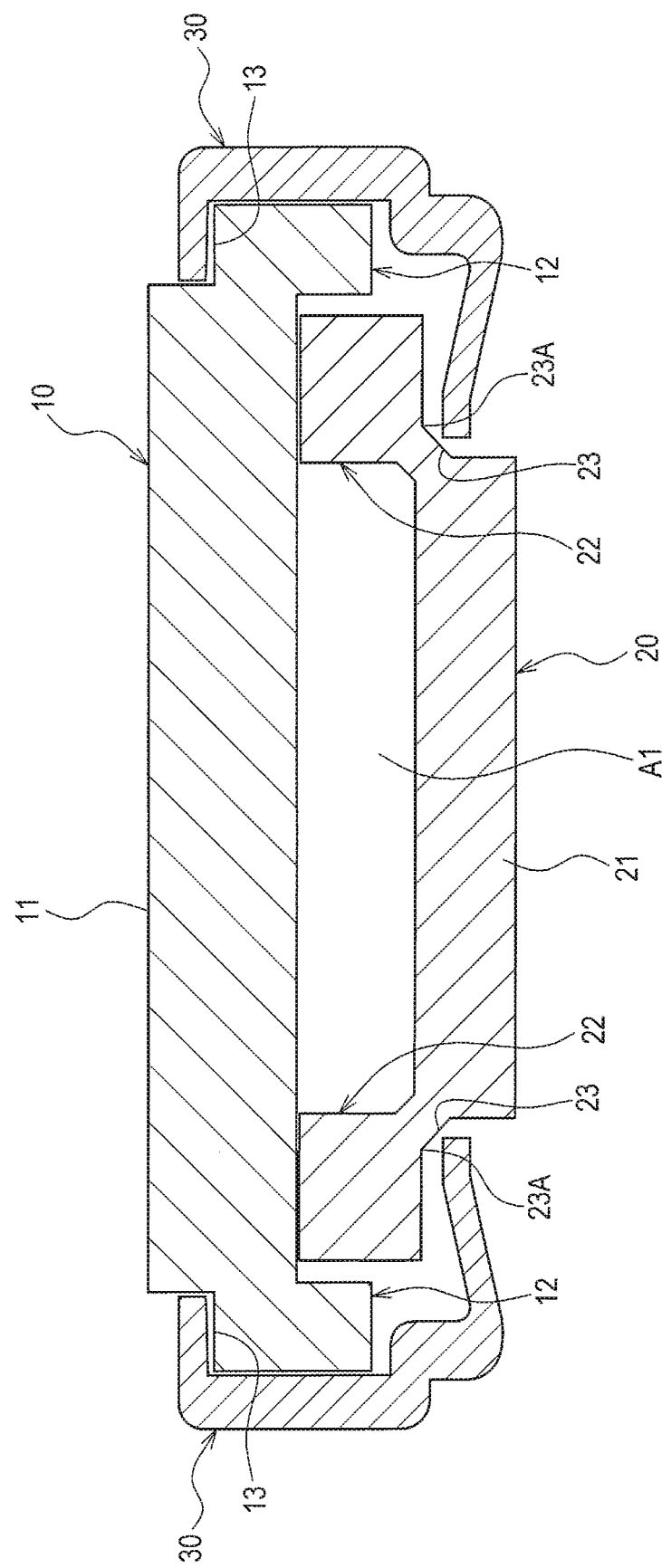
FIG. 2 is a diagram showing a structure of the recliner according to the first embodiment.

As shown in FIG. 2, the guide member 10 is a plate-shaped member comprising a disk-shaped first plate 11 and a first flange 12. The first flange 12 is a protrusion extending from the outer rim of the first plate 11 in a direction orthogonal to the first plate 11.

The first flange 12 is integrally formed with the first plate 11 from a metal plate by plastic forming such as press forming. The first plate 11 comprises a stepped portion 13 formed in a part of the outer rim thereof that corresponds to where the first flange 12 is. The stepped portion 13 is depressed toward the first flange 12.

<Ratchet>

The ratchet 20 is one example of the second member in the present disclosure, and is fixed to a back frame (not shown). The back frame forms the framework of a seatback. The seatback supports the back of the occupant.

The ratchet 20 is a plate-shaped member comprising a disk-shaped second plate 21 and a second flange 22. The second plate 21 faces the first plate 11 across a space A1.

As shown in FIG. 1, the second flange 22 is a protrusion extending from the entirety of an outer rim of the second plate 21 toward the first plate 11. The second flange 22 is integrally formed with the second plate 21 from a metal plate by plastic forming, such as press forming.

As shown in FIG. 2, a tapered portion 23 is provided in a boundary area between the second flange 22 and the second plate 21. The tapered portion 23 is provided on one side of the boundary area opposite to the space A1, that is, on the external side of the boundary area.

The tapered portion 23 is conically tapered such that the tapered portion 23 is inclined toward the first plate 11 along the radially outward direction of the ratchet 20. The tapered portion 23 comprises an outer edge 23A at the outermost position of the tapered portion 23 in the radial direction.

As shown in FIG. 1, the second flange 22 has, on its inner circumferential surface, serrations 24 that mesh with serrations 41A to 43A. The serrations 41A to 43A are provided on the respective pawls 41 to 43.

The pawls 41 to 43 are housed in the space A1 between the guide member 10 and the ratchet 20. The pawls 41 to 43 are movable toward and away from the second flange 22. While the serrations 41A to 43A are meshed with the serrations 24, the guide member 10 becomes non-rotatable with respect to the ratchet 20.

<Outer circumferential ring and Other Components>

The outer circumferential ring 30 couples the guide member 10 and the ratchet 20. Specifically, the outer circumferential ring 30, while allowing rotation of the guide member 10 relative to the ratchet 20, restricts the guide member 10 from moving away from the ratchet 20.

A hinge cam 44 is configured to move the pawls 41 to 43. When the hinge cam 44 rotates upon receipt of an external operation force, the serrations 41A to 43A of the pawls 41 to 43 are separated from the serrations 24.

When the operation force disappears, the pawls 41 to 43 are moved to positions where the serrations 41A to 43A fit into the serrations 24 by an elastic force of a spiral spring 45. Then, the pawls 41 to 43 are maintained at the positions by the elastic force.

Figure 3:
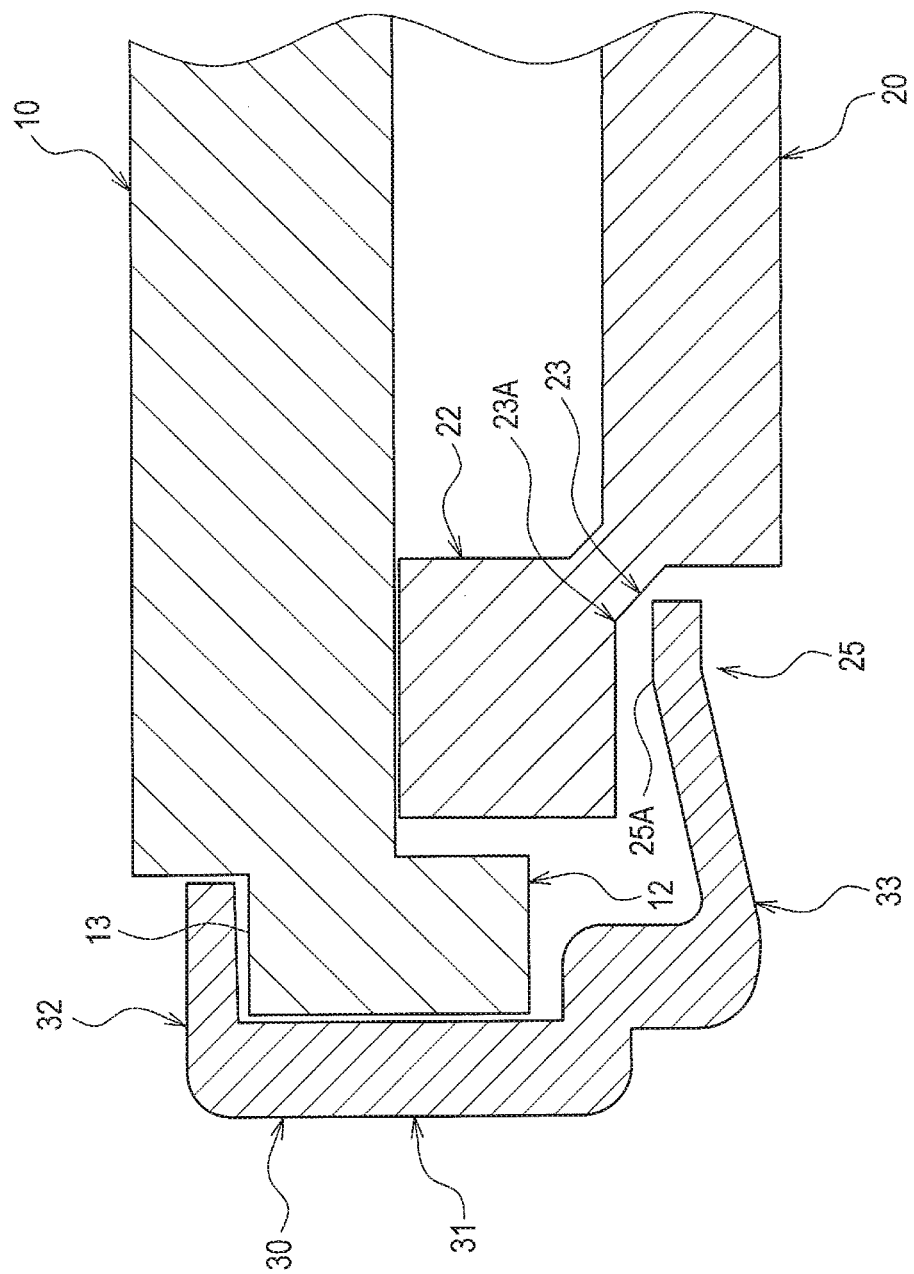
FIG. 3 is a diagram showing the structure of the recliner according to the first embodiment.

2. Details of Outer Circumferential Ring 2.1 Configuration of Outer Circumferential Ring As shown in FIG. 3, the outer circumferential ring 30 comprises an annular ring body 31, a first ring flange 32, and a second ring flange 33; and the outer circumferential ring 30 has a cross-section formed substantially into a U-shape to interpose the guide member 10 and the ratchet 20 therein.

Specifically, the first ring flange 32 and the second ring flange 33 extend radially inward from the ring body 31. "Extend radially inward" means to extend in a direction toward the center of the annular ring body 31.

The first ring flange 32 faces the outer-circumferential side of the guide member 10 (the stepped portion 13 in the present embodiment) on the outside of the guide member 10. The second ring flange 33 faces the outer-circumferential side of the ratchet 20 (the second flange 22 and the tapered portion 23 in the present embodiment) on the outside of the ratchet 20.

The clearance between the first ring flange 32 and the guide member 10 and the clearance between the second ring flange 33 and the ratchet 20 are as minute as less than 1 mm in nominal value.

Accordingly, the first ring flange 32 can come into contact with the outside of the guide member 10; and the second ring flange 33 can come into contact with the ratchet 20. The outside means, when the space interposed between the guide member 10 and the ratchet 20 is defined as an inside, the opposite side of the inside.

The second ring flange 33 comprises a bent portion 25 in its middle part in the extending direction. The bent portion 25 is bent to protrude toward the first plate 11. The second ring flange 33 can externally come into contact with the tapered portion 23 at its tip in the extending direction.

Specifically, the second ring flange 33 has a cross-section that is bent substantially into an L-shape to protrude toward the second flange 22. The bent portion 25 has a top 25A positioned radially outside of the outer edge 23A of the tapered portion 23.

2.1 Method for Manufacturing Recliner (particularly Outer Circumferential Ring)

Figure 4:
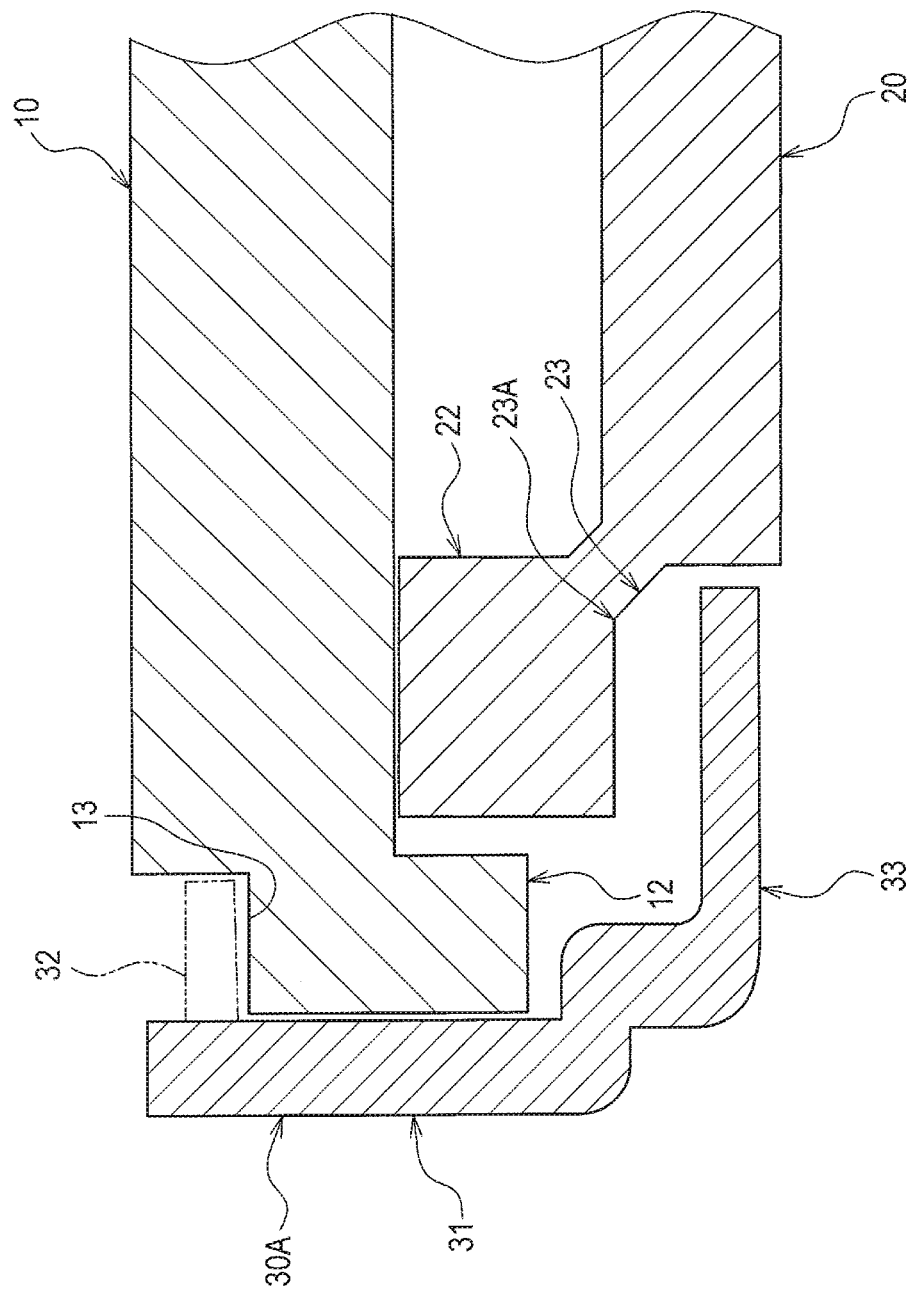
FIG. 4 is a diagram illustrating a method for manufacturing the recliner according to the first embodiment.

As shown in FIG. 4, a manufacturer (including a manufacturing machine and a cooperate person such as a manufacturing company) that manufactures the recliner 1 first attaches the outer circumferential ring 30 (hereinafter referred to as a before-swaging ring 30A), in which the first ring flange 32 and the bent portion 25 are not yet formed, to the outer-circumferential-surface (the first flange 12) side of the guide member 10.

Then, the manufacturer performs plastic forming, such as swaging, on the attached before-swaging ring 30A to make the first ring flange 32. At this time, the ring body 31 is swaged such that a portion of the ring body 31 toward the guide member 10 is squeezed; and the first ring flange 32 is thus integrally formed with the ring body 31.

Figure 5:
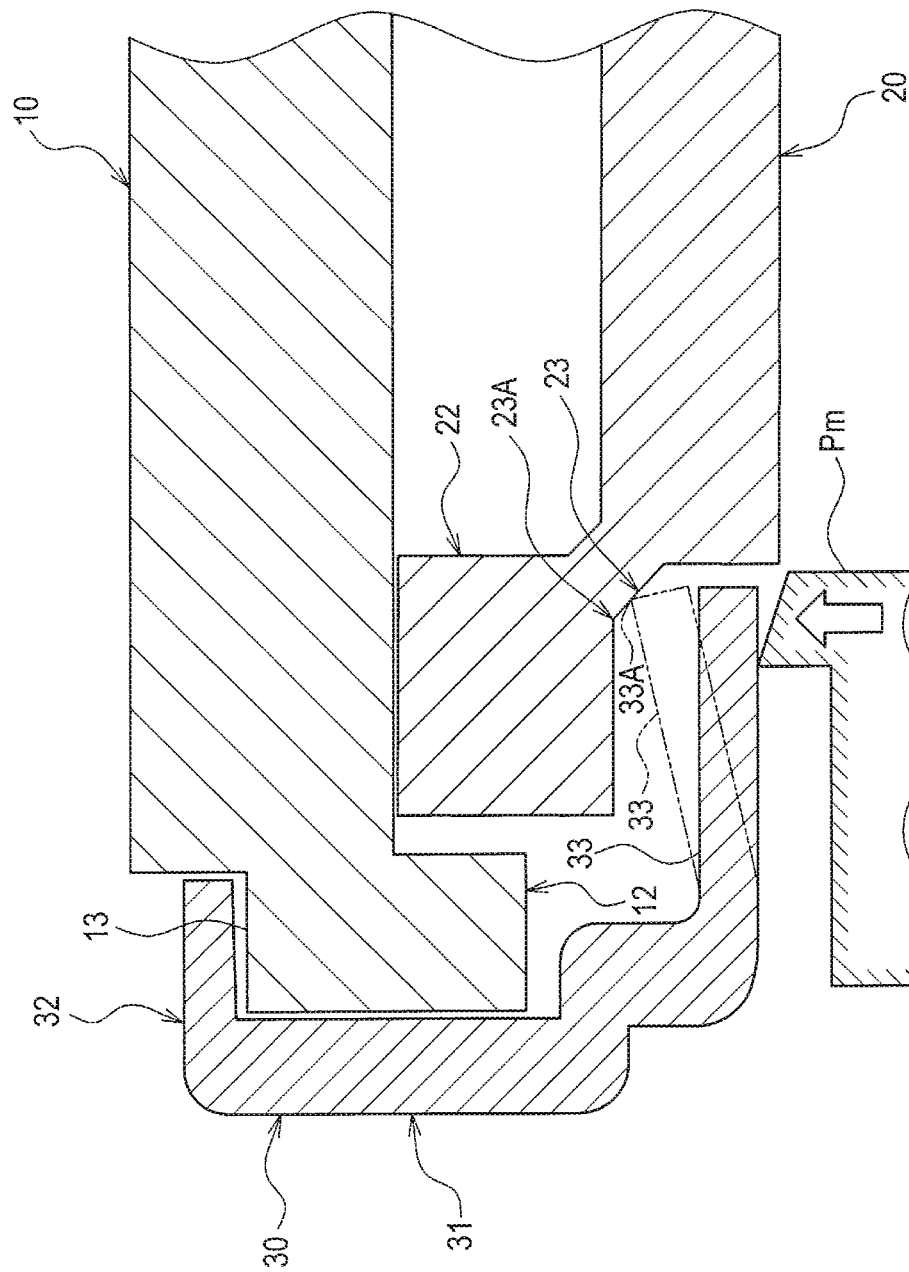
FIG. 5 is a diagram illustrating the method for manufacturing the recliner according to the first embodiment.
Figure 6:
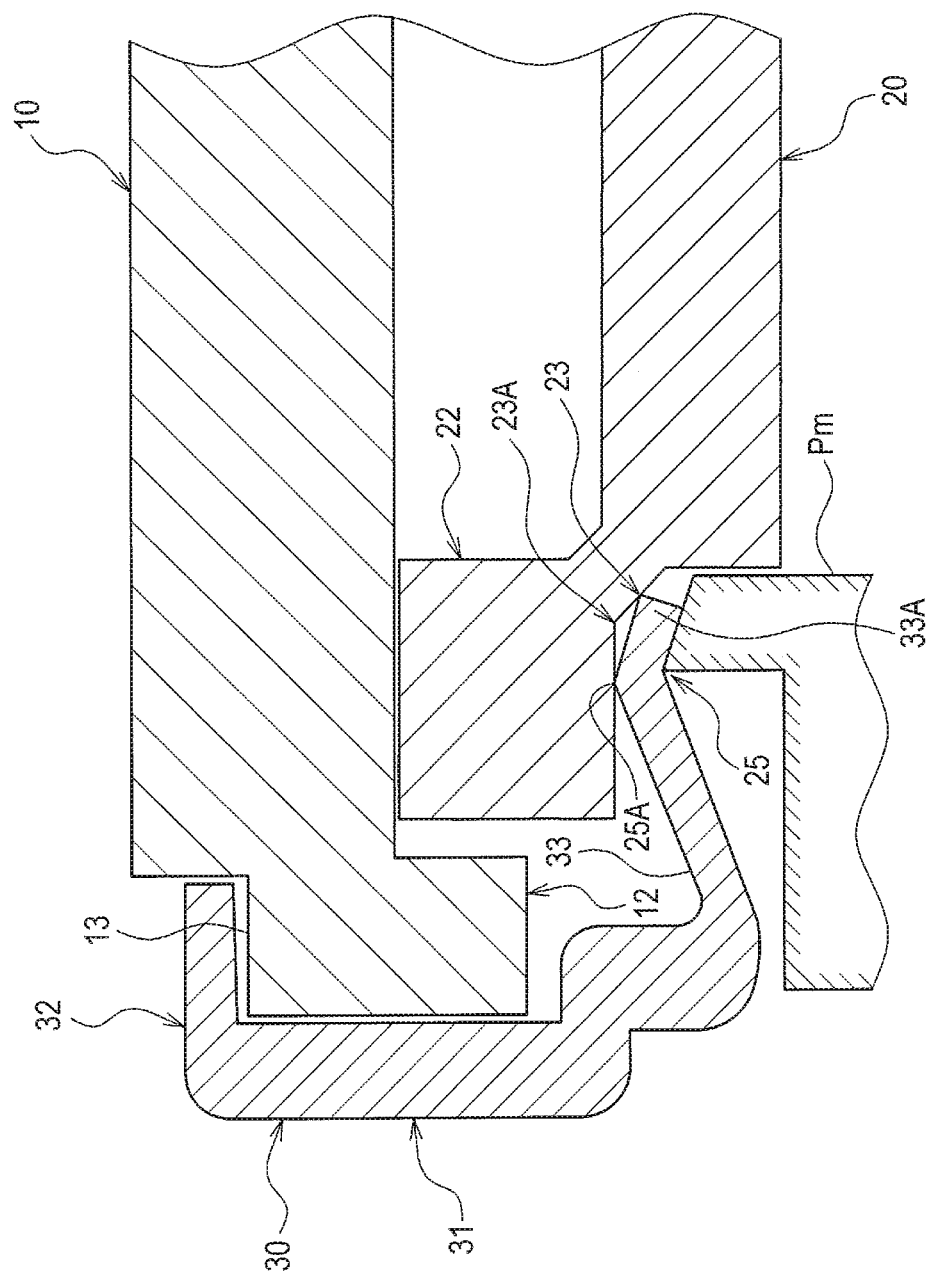
FIG. 6 is a diagram illustrating the method for manufacturing the recliner according to the first embodiment.

As shown in FIG. 5 and FIG. 6, the manufacturer then presses the second ring flange 33 in which the bent portion 25 is not yet formed against the tapered portion 23 using a metallic press die Pm to plastically deform the second ring flange 33 and form the bent portion 25.

Specifically, when the second ring flange 33 in which the bent portion 25 is not yet formed is pressed against the tapered portion 23, the second ring flange 33 is bent, as shown in FIG. 5, from the root (the ring body 31) side of the second ring flange 33 so that a tip 33A of the second ring flange 33 comes into contact with the tapered portion 23.

In this state, since the tip 33A of the second ring flange 33 is in contact with the tapered portion 23, the tip 33A becomes stationary. When the second ring flange 33 is further pressed toward the second flange 22, the second ring flange 33 is further bent, as shown in FIG. 6, to be buckled from a portion away from the tip 33A toward the ring body 31.

At this time, the second ring flange 33 is further bent so that the above-mentioned portion comes into contact with the second flange 22; and, as a result, the bent portion 25 is formed having the above-mentioned portion as the top 25A thereof. Accordingly, the second ring flange 33 is bent such that the cross-section thereof becomes substantially L-shaped and protrudes toward the second flange 22 while the top 25A of the bent portion 25 is formed radially outside of the outer edge 23A of the tapered portion 23.

Figure 7:
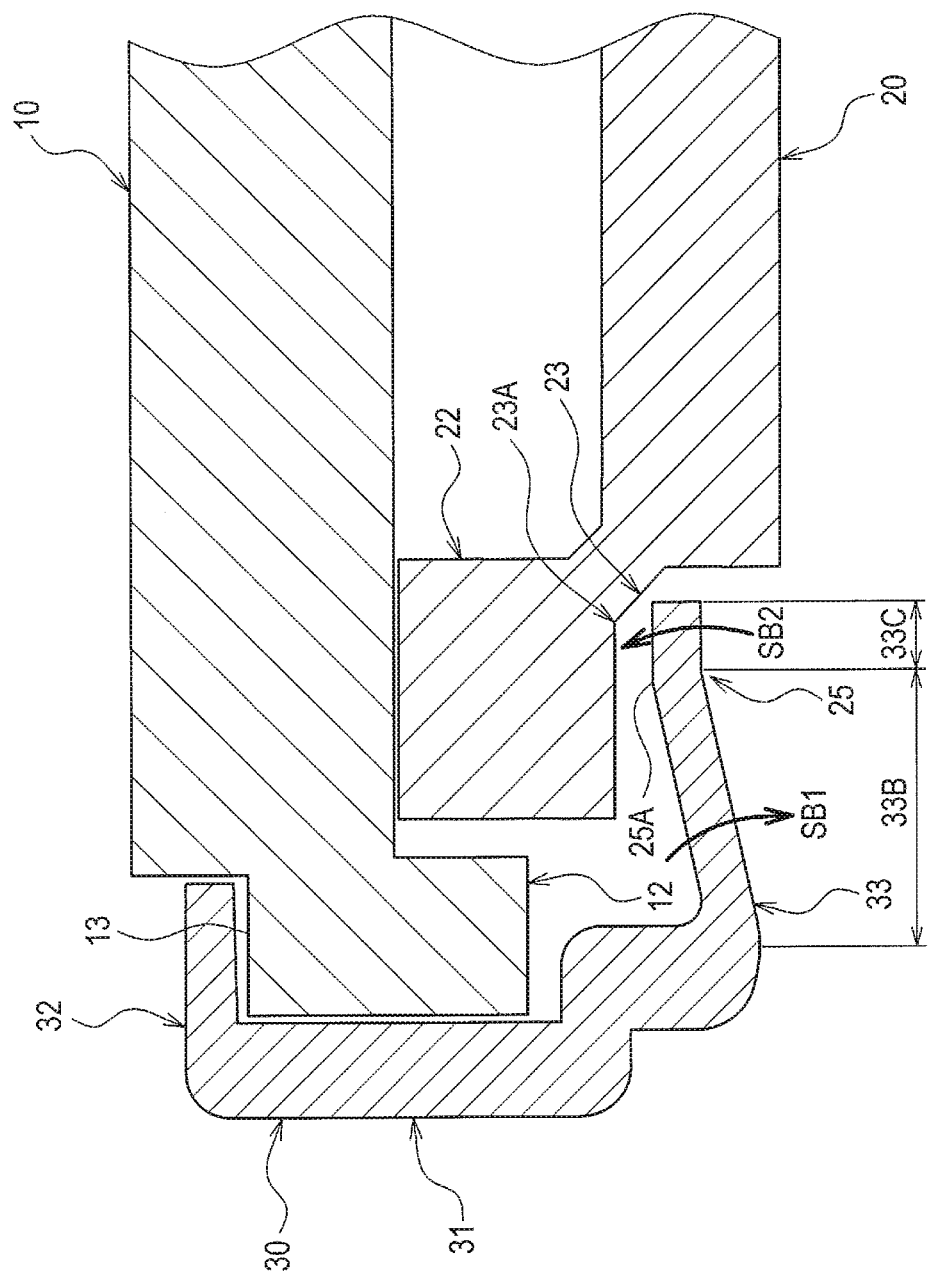
FIG. 7 is a diagram showing the structure of the recliner according to the first embodiment.

3. Features of Recliner and Manufacturing Method according to Present Embodiment (see FIG. 7)

The manufacturer performs plastic forming (press working) by, for example, pressing the second ring flange 33 in which the bent portion 25 is not yet formed against the tapered portion 23 with the metallic press die Pm. Accordingly, the manufacturer can plastically deform a part of the second ring flange 33 to form the bent portion 25.

Thus, a portion 33B positioned toward the ring body 31 in relation to the top 25A of the bent portion 25 goes back in a direction (see an arrow SB1) to be slightly away from the tapered portion 23 and the second flange 22 due to a springback effect that occurs when the bent portion 25 is formed. A portion 33C on the leading-end side in relation to the top 25A of the bent portion 25 goes back in a direction (see an arrow SB2) to be adjacent to the tapered portion 23 due to the springback effect that occurs when the bent portion 25 is formed.

In other words, even though the second ring flange 33 is pressed against the tapered portion 23, the portion 33B moves away from the tapered portion 23 and the second flange 22 due to the springback effect in the portion 33B toward the ring body 31.

On the other hand, since the portion 33C on the leading-end side is bent in a direction opposite to that of the portion 33B toward the ring body 31, the tip 33A of the second ring flange 33 approaches the tapered portion 23 due to the springback effect that occurs in the portion 33C on the leading-end side.

Accordingly, the manufacturer can achieve the recliner 1 in which the clearance is minimal between the second ring flange 33 and the tapered portion 23. This configuration inhibits the pressure on the contacting surfaces of the guide member 10 and the ratchet 20 from being excessively high and inhibits formation of a large clearance between the guide member 10 and the ratchet 20.

(Other Embodiments)

The above-described embodiment has described the recliner in which the guide member 10 is fixed to the cushion frame while the ratchet 20 is fixed to the back frame. The present disclosure, however, is not limited to this configuration.

The recliner according to the present disclosure may be configured, for example, such that the guide member 10 is fixed to the back frame while the ratchet 20 is fixed to the cushion frame.

The above-described embodiment has described the manufacturing method in which the first ring flange 32 is formed and then the bent portion 25 of the second ring flange 33 is formed. The present disclosure, however, is not limited to this approach; and other manufacturing methods may be employed.

The above-described embodiment has described an example in which the rotational coupler is applied to the recliner 1. The present disclosure is, however, not limited to this application. The present disclosure is also applicable to other rotational couplers.

In the above-described embodiment, the rotational coupler is applied to the vehicle seat. The present disclosure is, however, not limited to this application and may be applied to seats for vehicles, such as railroad cars, ships, boats, and aircrafts, as well as stationary seats for theaters, homes, and so on.

Furthermore, the present disclosure is not limited to the aforementioned embodiments; and variations and modifications are possible as long as they conform to the spirit of the present disclosure described in the aforementioned embodiments. The present disclosure, therefore, may employ a configuration obtained by combining at least two of the aforementioned embodiments, or a configuration obtained by removing any one of the constituent features of the present invention that are described in the aforementioned embodiments.

The invention claimed is:

1. A method for manufacturing a rotational coupler, the rotational coupler comprising:
    a plate-shaped first member comprising:
        a disk-shaped first plate; and
        a first flange extending from an outer rim of the first plate in a direction orthogonal to the first plate;
    a plate-shaped second member comprising:
        a disk-shaped second plate facing the first plate across a space; and
        a second flange extending from an entirety of an outer rim of the second plate toward the first plate;
    a tapered portion provided in a boundary area, positioned between the second flange and the second plate, on one side of the boundary area opposite to the space, the tapered portion being inclined toward the first plate along a radially outward direction; and
    an outer circumferential ring configured to restrict the second plate from moving away from the first plate, the outer circumferential ring comprising:
        an annular ring body;
        a first ring flange extending radially inward from the ring body; and
        a second ring flange extending radially inward from the ring body,
    wherein the first ring flange is configured to externally come into contact with the first member, and
    wherein the second ring flange comprises a bent portion that is bent to protrude toward the first plate, the bent portion being provided in a middle part of the second ring flange in an extending direction, and
    the method comprising:
        attaching a before-swaging ring to the first member and the second member that are in contact with each other, the before-swaging ring corresponding to the outer circumferential ring in which the first ring flange and the bent portion have been unformed;

forming the first ring flange by plastic forming of the before-swaging ring attached; and forming the bent portion by pressing a tip of the second ring flange in which the bent portion has been unformed against the tapered portion with a metallic press die so as to plastically deform the second ring flange.

2. The method for manufacturing a rotational coupler according to claim 1, wherein the bent portion comprises a top positioned radially outside of an outer edge of the tapered portion.

3. A method for manufacturing a rotational coupler for pivotable coupling of a seatback to a seat cushion, the rotational coupler comprising:

a plate-shaped first member comprising:
  a disk-shaped first plate; and
  a first flange extending from an outer rim of the first plate in a direction orthogonal to the first plate, the first member being configured to be fixed to the seat cushion;

a plate-shaped second member comprising:
  a disk-shaped second plate facing the first plate across a space; and
  a second flange extending from an entirety of an outer rim of the second plate toward the first plate, the second member being configured to be fixed to the seatback;

a tapered portion provided in a boundary area, positioned between the second flange and the second plate, on one side of the boundary area opposite to the space, the tapered portion being inclined toward the first plate along a radially outward direction; and an outer circumferential ring configured to restrict the second plate from moving away from the first plate, the outer circumferential ring comprising:
  an annular ring body;
  a first ring flange extending radially inward from the ring body; and
  a second ring flange extending radially inward from the ring body, wherein the first ring flange is configured to come into contact with the first member from an opposite side of the space, and wherein the second ring flange comprises a bent portion that is bent to protrude toward the first plate, the bent portion being provided in a middle part of the second ring flange in an extending direction, and the method comprising:

attaching a before-swaging ring to the first member and the second member that are in contact with each other, the before-swaging ring corresponding to the outer circumferential ring in which the first ring flange and the bent portion have been unformed;

forming the first ring flange by plastic forming of the before-swaging ring attached; and forming the bent portion by pressing a tip of the second ring flange in which the bent portion has been unformed against the tapered portion with a metallic press die so as to plastically deform the second ring flange.

4. The method for manufacturing a rotational coupler according to claim 3, wherein the bent portion comprises a top positioned radially outside of an outer edge of the tapered portion.

* * * * *